F. ANDERSON.
DUST GUARD.
APPLICATION FILED APR. 24, 1916.
1,206,191.
Patented Nov. 28, 1916.
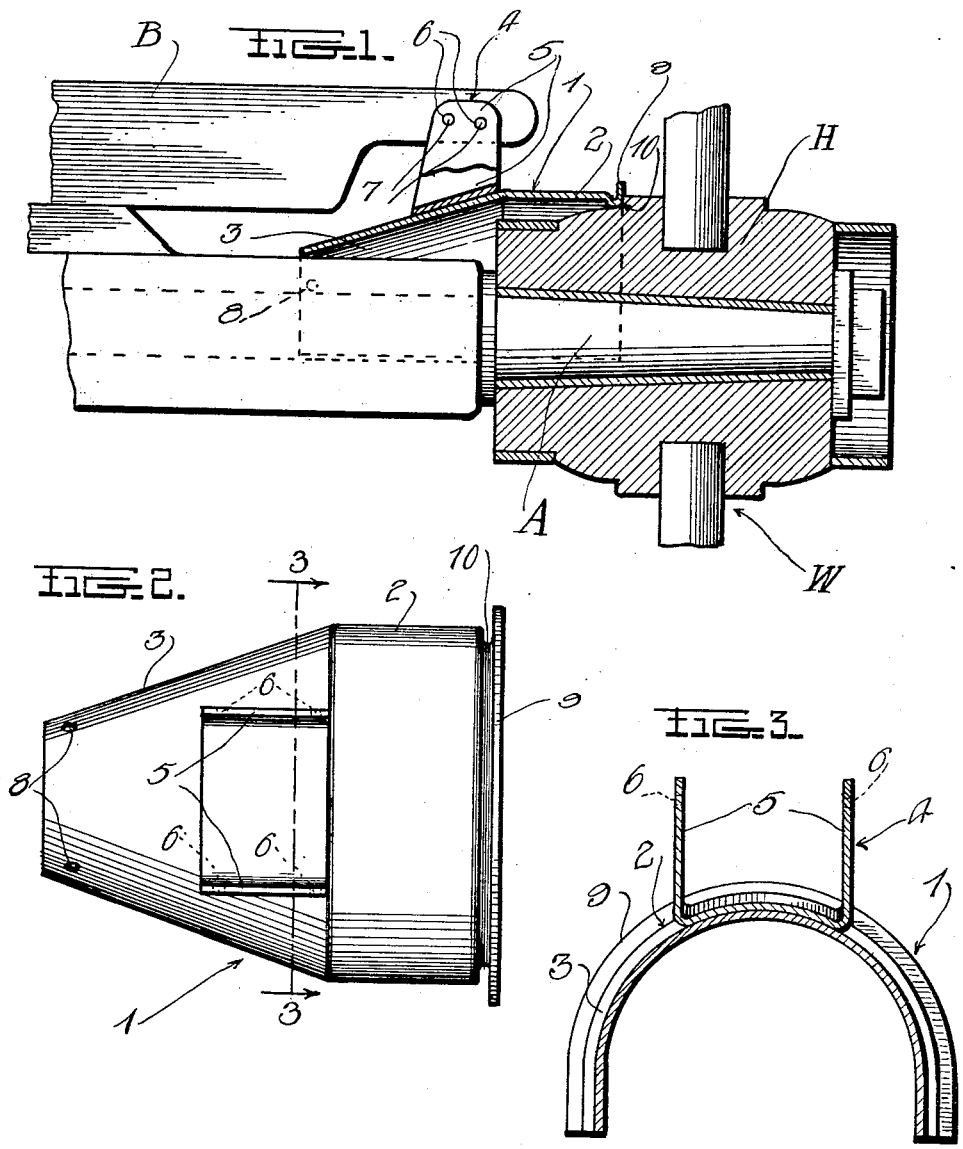
Witness
George W. Giovannetti
Inventor
FRANK ANDERSON
By H. B. Willson & Co.
Attorneys

UNITED STATES PATENT OFFICE.

FRANK ANDERSON, OF PROTECTION, KANSAS.

DUST-GUARD.

1,206,191.  Specification of Letters Patent.  Patented Nov. 28, 1916.

Application filed April 24, 1916. Serial No. 93,198.

*To all whom it may concern:*

Be it known that I, FRANK ANDERSON, a citizen of the United States, residing at Protection, in the county of Comanche and State of Kansas, have invented certain new and useful Improvements in Dust-Guards; and I do declare the following to be a full, clear, and exact description of the invention, such as will enable others skilled in the art to which it appertains to make and use the same.

This invention relates to improvements in dust guards or shields for the hubs of vehicles, which are adapted to prevent the entrance of dust, sand, or other foreign matter between the spindle of the axle and the axle box of the wheel.

The principal object of this invention is to construct an extremely simple device of this character which can be very quickly and readily applied to the hub of a wheel and secured in adjusted position thereon.

With this and many other objects in view, my invention resides in the novel features of construction, combination and arrangement of parts which will be hereinafter more particularly described and claimed and shown in the drawings wherein:

Figure 1 represents a vertical longitudinal section through the hub and adjacent portions of a vehicle wheel, showing my improved dust guard applied thereto, said guard also being in section; Fig. 2 is a top plan view of the guard removed; and Fig. 3 is a vertical transverse section taken on the line 3—3 of Fig. 2.

In the accompanying drawing is shown my improved protector applied to the hub H of a rear wheel W of an ordinary type of wagon. It is obvious, however, that the same is applied to the inner portions of the hubs of all of the wheels thereof. It is well known that dirt and other foreign matter which is picked up by the wheels during their movement frequently drops upon the hubs, and from there finds its way into the axle boxes of the wheels.

My invention is designed to obviate this difficulty by covering the inner portion of the hub and the adjacent portion of the spindle of the axle A by the guard 1 which is preferably formed of sheet metal. This guard 1 comprises a semi-cylindrical portion 2 which is designed to overlie the hub H, and an arched portion 3 which decreases in size from the edge of the semi-cylindrical portion 2 to its end, as shown in Fig. 1. These two portions 2 and 3 may be formed of the same sheet of metal by being stamped into the desired shape, or they may be formed of separate sections soldered or otherwise connected together. The tapered portion 3 covers the spindle of the axle A and also the adjacent portions of said axle.

A U-shaped member 4 is secured to the top of the guard 1, preferably the tapered portion 3, by soldering or by any other preferred or convenient means. The arms 5 of this member 4 extend upwardly and are apertured as shown at 6 so that they may be attached to the bolster B or any other convenient part of the body or frame of the wagon, so as to hold the guard in place above the hub and axle. It will be noted that one of these arms 5 is disposed upon each side of the bolster and secured thereto by the fastening elements 7. By this arrangement, the guard may be disposed in adjusted positions above the hub H so that it will operate to the best advantage. If necessary, additional fastening elements 8 may be driven through the end of the tapered portion 3 and into the axle A.

In order to prevent mud and sand dropped upon the semi-cylindrical portion of the guard from the wheel from working beneath the same, I form the outer edge of said portion 2 with an upright outwardly extending flange 9. This flange preferably contacts with one of the annular shoulders formed in the hub H of the wheel, and by this simple arrangement dust and dirt may be prevented from finding its way between the hub and guard, and hence to the axle box.

As a further means for protecting the axle box, a depending inwardly extending bead 10 is formed in the outer part of the semi-cylindrical portion 2 adjacent the flange 9. This bead contacts with the hub H and effectively coöperates with the flange 9 to prevent the entrance of dirt beneath the guard. The bead 10 is preferably formed by bending the guard inwardly as is shown, although if found advisable, a separate member may be secured to the inner face of the semi-cylindrical portion, especially if there is found to be much wear upon the parts.

The guard is adjusted to obtain the best results so that only the bead 10 and the flange 9 will contact with the rotating members of the wheel, the remaining portions of the guard being held above the same by the attaching arms 5.

It is obvious that a device constructed as above described may be manufactured at a slight cost, and it will be found to be extremely advantageous in use.

Various minor changes in form and proportion may be made within the scope of the appended claims to accommodate the application of the invention to various types of vehicles.

I claim:

1. A device of the class described comprising a semi-cylindrical guard adapted to be disposed above the hub of a wheel, and a pair of spaced apart arms extending from the top thereof to be attached to a stationary portion of the vehicle to secure the guard in adjusted positions above said hub.

2. In a device of the class described, a guard, semi-cylindrical for a portion of its length, the rest of said guard being arched in cross section and decreased in size from the edge of the first mentioned portion to its end, a U-shaped member secured to the top of said guard, the upright portions of said member forming attaching arms to be attached to a stationary portion of a vehicle to secure the guard in adjusted positions above said hub, and a depending inwardly extending bead on the outer edge of said guard adapted to contact with the hub.

In testimony whereof I have hereunto set my hand in presence of two subscribing witnesses.

FRANK ANDERSON.

Witnesses:
F. H. ELLSWORTH,
FRED E. FOSTER.

Copies of this patent may be obtained for five cents each, by addressing the "Commissioner of Patents, Washington, D. C."